(12) United States Patent
Lee

(10) Patent No.: US 6,886,022 B2
(45) Date of Patent: *Apr. 26, 2005

(54) CALCULATOR WITH LIQUID ORNAMENT

(76) Inventor: Vincent K. Lee, No. 4F, No. 48, Lane 10, Chi Fu Rd., Taipei 114 (TW)

( * ) Notice: Subject to any disclaimer, the term of this patent is extended or adjusted under 35 U.S.C. 154(b) by 588 days.

This patent is subject to a terminal disclaimer.

(21) Appl. No.: 10/097,938

(22) Filed: Mar. 15, 2002

(65) Prior Publication Data

US 2003/0177153 A1 Sep. 18, 2003

(51) Int. Cl.⁷ .............................................. G06F 15/02
(52) U.S. Cl. ..................................................... 708/100
(58) Field of Search ................................ 708/100, 130; D18/6, 11

(56) References Cited

U.S. PATENT DOCUMENTS 5,379,274 A * 1/1995 Lee ............................. 368/317
6,066,021 A * 5/2000 Lee ............................. 446/77
6,380,926 B1 * 4/2002 Ho .............................. 345/163
6,438,072 B1 * 8/2002 Tsai ............................ 368/228

* cited by examiner

Primary Examiner—Chuong Dinh Ngo
(74) Attorney, Agent, or Firm—Dennison, Schultz, Dougherty & MacDonald

(57) ABSTRACT

A calculator with liquid ornament includes a base, on a predetermined position of which a downward cavity is formed for detachably or fixedly receiving a hollow enclosure therein. The cavity has dimensions and shape matching with an appearance of the base, and the hollow enclosure has dimensions and shape matching with appearances of the calculator and the cavity to create an integral beauty for the calculator. The hollow enclosure is adapted to contain different types of decorative liquids and floating ornaments therein, giving the calculator a unique appearance and added value.

7 Claims, 5 Drawing Sheets

CALCULATOR WITH LIQUID ORNAMENT

BACKGROUND OF THE INVENTION

The present invention relates to a calculator with liquid ornament, and more particularly to a calculator having a liquid ornament incorporated therewith to create unique appearance and added value for the calculator.

People's living quality is increasingly upgraded with the rapid developments in different industrial fields. Most consumers demand for higher quality and better functions in selection of their desired products. The selected products must be economical and cost effective while they provide good basic functions. The selected products must also be novel and unique in their appearances. There are many home appliances and articles, such as calculators or timers having similar calculating functions, which are not eye-catching but frequently appear in our living environments. It would be a good idea to give these appliances or articles new and novel appearances and added values without detriment to their basic functions.

SUMMARY OF THE INVENTION

A primary object of the present invention is to provide a calculator or a timer having similar calculating functions, on a base of which a liquid ornament is connected to create a new and unique appearance for the calculator or the timer, making the same eye-catching and capable of providing multiple functions of decorating, calculating, and time counting.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
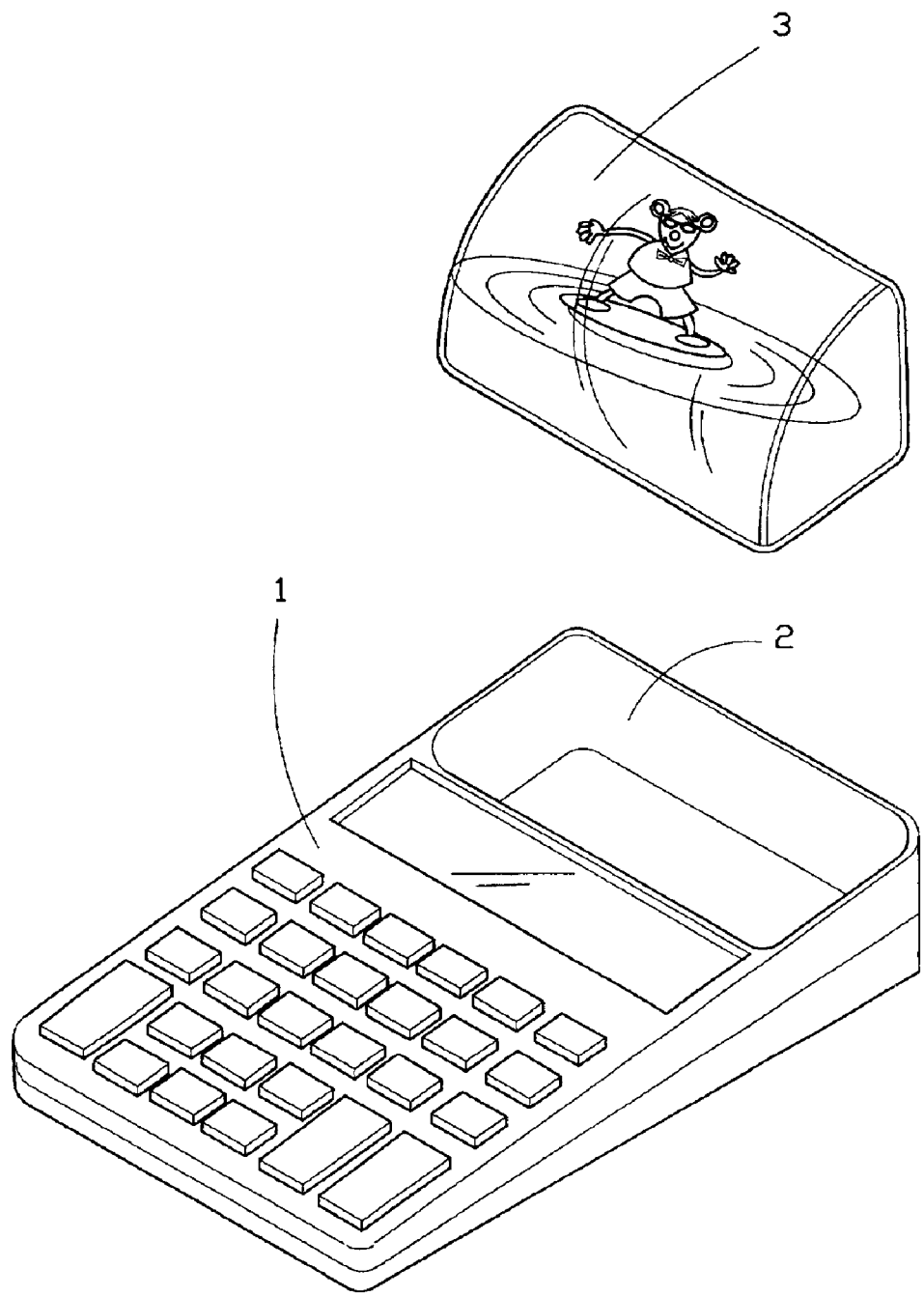
FIG. 1 is an exploded perspective view of a calculator with liquid ornament according to a first embodiment of the present invention.
Figure 2:
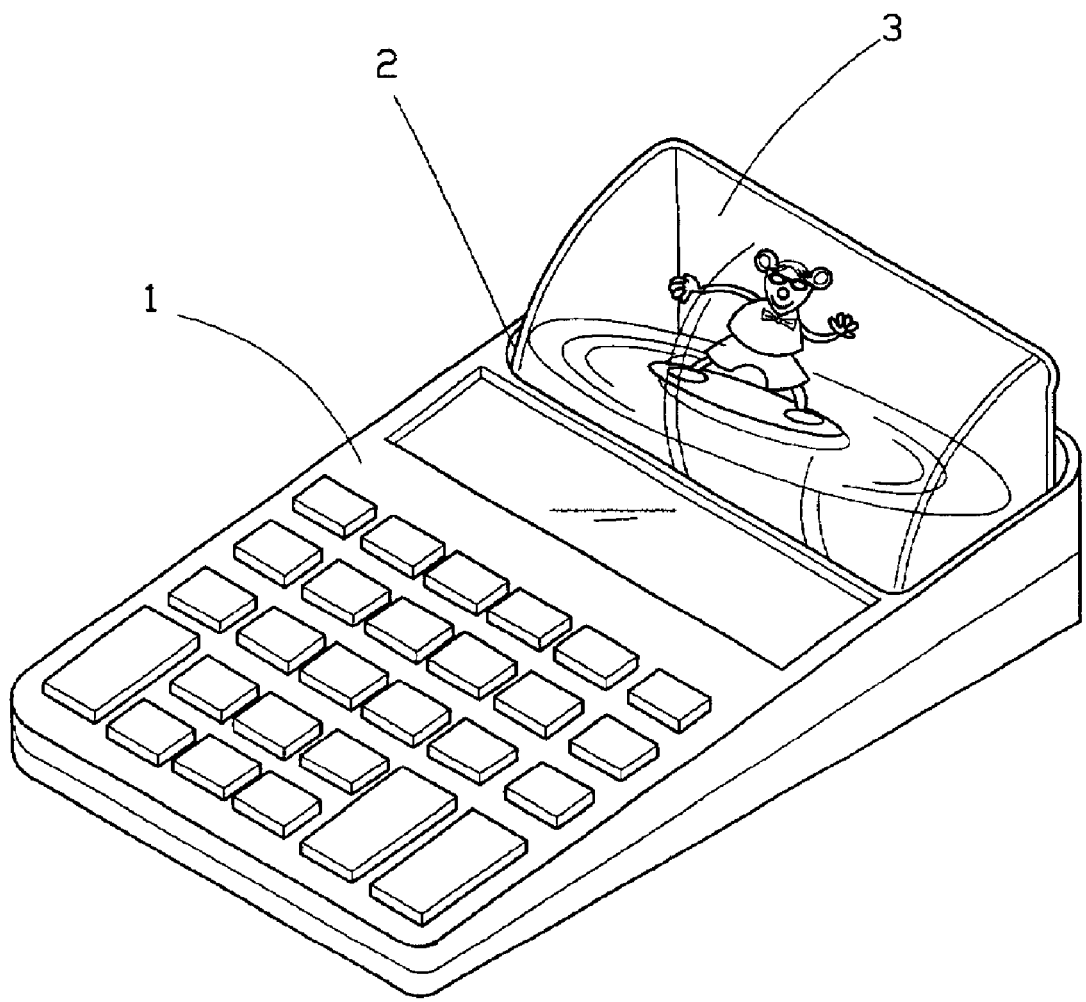
FIG. 2 is an assembled perspective view of FIG. 1.
Figure 5:
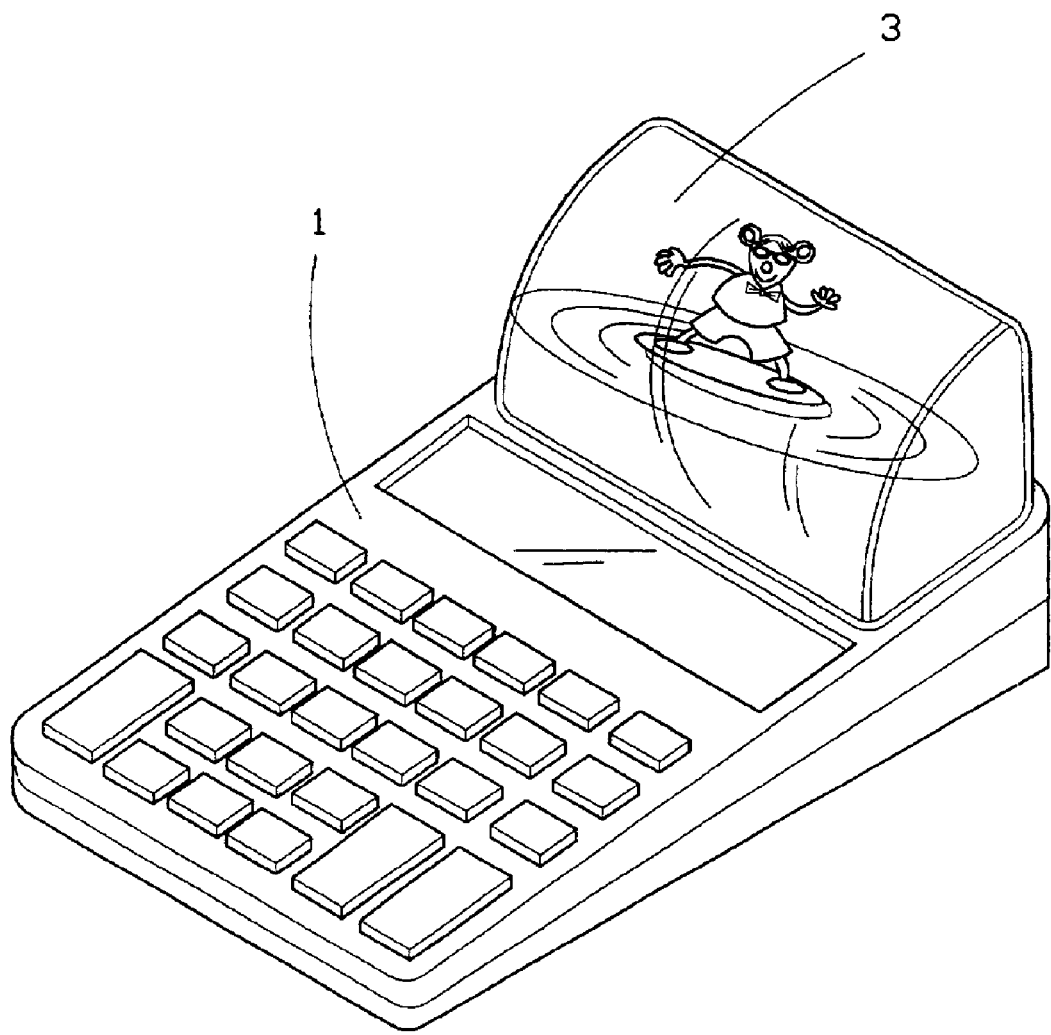
FIG. 5 is an assembled perspective view of a calculator with liquid ornament according to a fourth embodiment of the present invention.

Please refer to FIGS. 1 and 2 that are exploded and assembled perspective views, respectively, of a calculator with liquid ornament according to a first embodiment of the present invention. It is to be noted that the present invention may be implemented on not only a calculator but also any other similar product, such as a timer that has the function of a calculator. The calculator is formed on a base 1 thereof at a predetermined position with a downward cavity 2 through molding or in other known manners. The cavity 2 may be of any shape or configuration, depending on an appearance or contour of the base 1. Either a geometrical or a streamlined cavity 2 is acceptable. The cavity 2 may have a depth equal to a full thickness of the base 1 so as to vertically extend through the base 1, or may be half sunk into the base 1. In either case, the cavity 2 is formed for a hollow enclosure 3 to detachably but securely set thereinto or to integrally connect to a peripheral edge thereof. The hollow enclosure 3 forms a liquid ornament and may be of any shape or configuration to match with an appearance or contour of the calculator, in order to obtain a harmonious beauty for the entire calculator. However, it is to be noted that the hollow enclosure 3 must have a lower part so dimensioned and shaped that it could be fitly and firmly set in the cavity 2, as shown in FIG. 2, or be integrally formed on the peripheral edge of the cavity 2 on a top of the base 1, as shown in FIG. 5, so that the entire calculator has a pleasant appearance.

Figure 3:
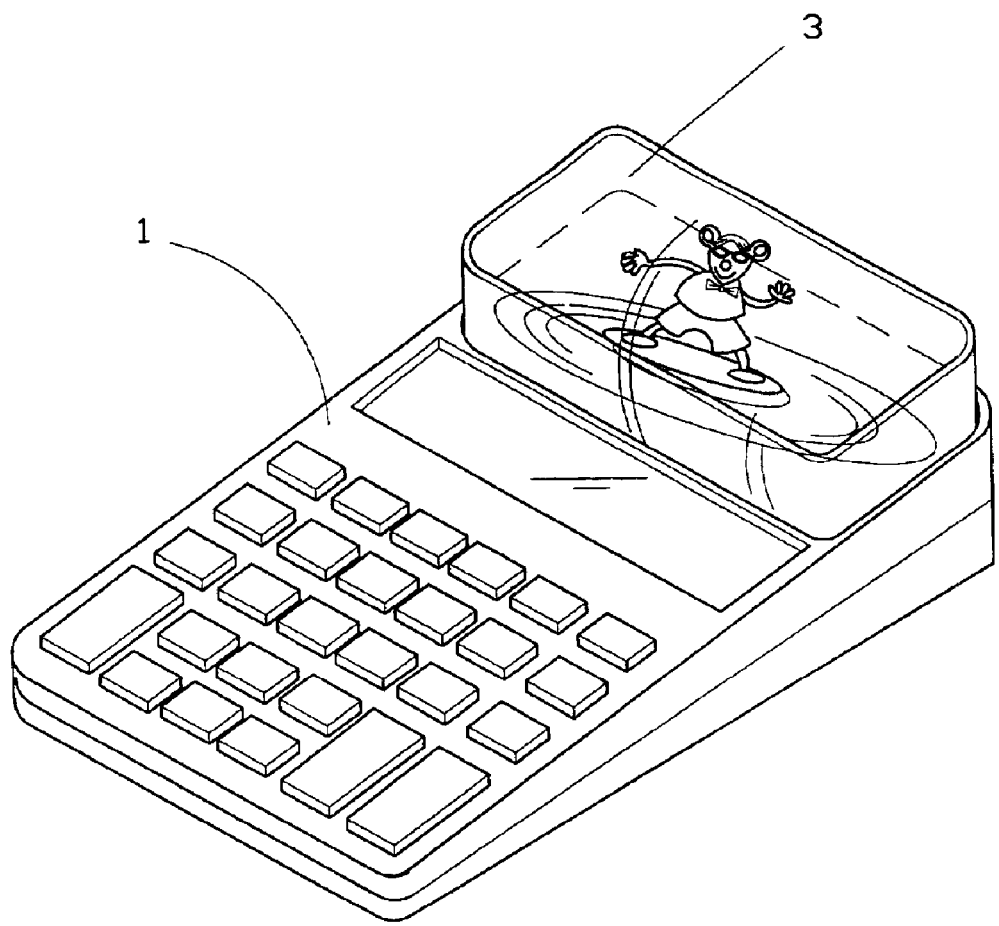
FIGS. 3 and 4 are assembled perspective views of calculators with liquid ornament according to second and third embodiments of the present invention.
Figure 4:
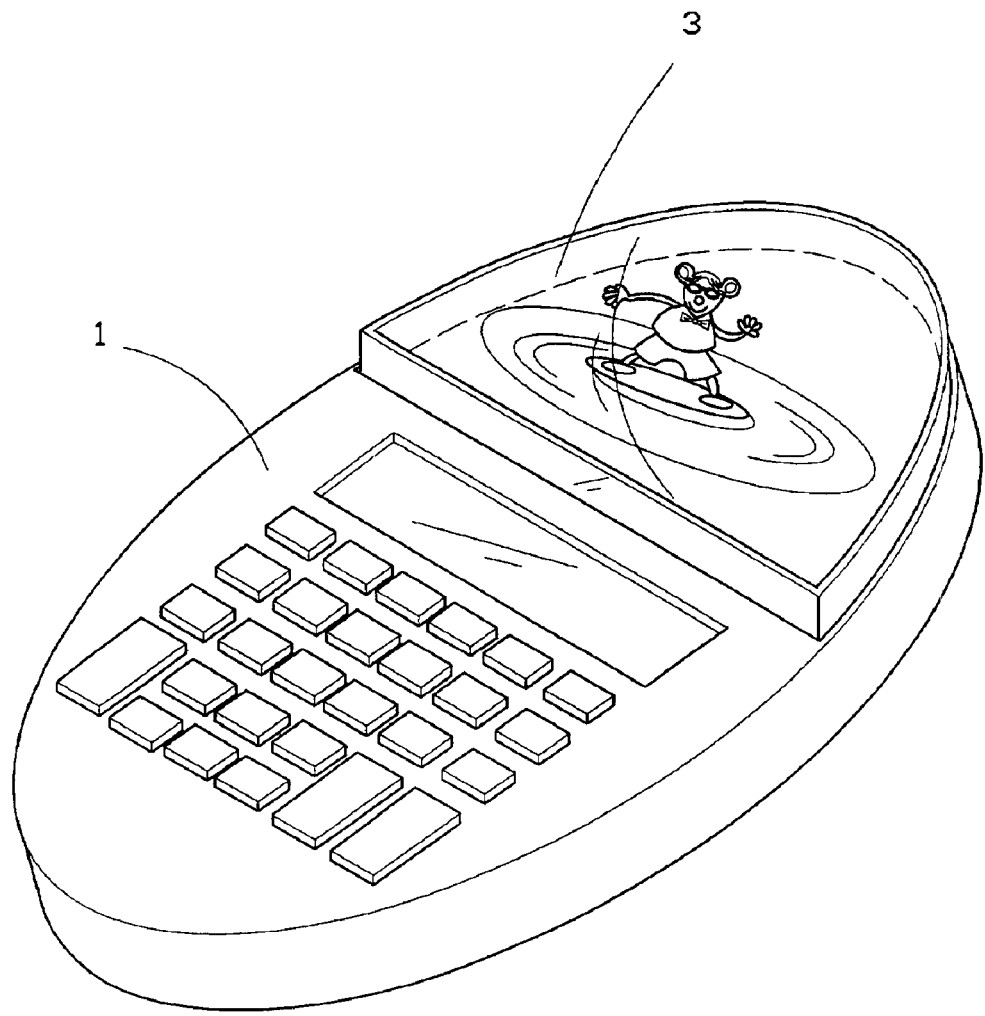

The hollow enclosure 3 may be of any shape or configuration, and may contain different types of decorations therein, such as mono-liquid or dual-liquid or other dynamically flowing liquid and floating articles. In either case, it is very important for the hollow enclosure 3 to have dimensions and shapes matching with those of the cavity 2 formed on the base 1 of the calculator. FIGS. 3, 4 and 5 show some other embodiments of the present invention with differently shaped hollow enclosures 3, which may be separately set into the cavity 2 or integrally formed on the cavity 2 on differently shaped bases 1 of the calculators. With the liquid ornament provided by the hollow enclosure 3 on the base 1, the calculator presents a completely new and attracting appearance and provides additional decorating function to create added value thereof.

What is claimed is:

1. A calculator with liquid ornament, comprising a calculator having a base, on a predetermined position of said base a downward extended cavity is formed through molding or in other known manners; said cavity being of any shape, depending on an appearance or contour of said base, for receiving a hollow enclosure therein; and said hollow enclosure containing one or more decorative liquids and floating ornaments therein.

2. The calculator with liquid ornament as claimed in claim 1, wherein said cavity has a depth equal to a full thickness of said base.

3. The calculator with liquid ornament as claimed in claim 1, wherein said cavity has a depth half sunk into said base.

4. The calculator with liquid ornament as claimed in claim 1, wherein said hollow enclosure may be of any shape to match with an appearance of said calculator but always has a lower part dimensioned and shaped to match with those of said cavity for fitly and securely engaging with said cavity.

5. The calculator with liquid ornament as claimed in claim 1, wherein said hollow enclosure is detachably set in said cavity.

6. The calculator with liquid ornament as claimed in claim 1, wherein said hollow enclosure is integrally formed on a peripheral edge of said cavity.

7. The calculator with liquid ornament as claimed in claim 1, wherein said calculator is a timer providing calculating functions.

* * * * *